US00RE48340E

(19) United States
(12) Reissued Patent
Hsu et al.

(10) Patent Number: US RE48,340 E
(45) Date of Reissued Patent: Dec. 1, 2020

(54) NON-OVERLAP DATA TRANSMISSION METHOD FOR LIQUID CRYSTAL DISPLAY AND RELATED TRANSMISSION CIRCUIT

(71) Applicant: NOVATEK Microelectronics Corp., Hsin-Chu (TW)

(72) Inventors: Chih-Yung Hsu, Hsinchu County (TW); Kai-I Dai, Taoyuan (TW); Jie-Jung Huang, Miaoli County (TW)

(73) Assignee: NOVATEK Microelectronics Corp., Hsin-Chu (TW)

(21) Appl. No.: 15/986,833

(22) Filed: May 23, 2018

Related U.S. Patent Documents

Reissue of:
(64) Patent No.: 9,349,332
Issued: May 24, 2016
Appl. No.: 14/231,756
Filed: Apr. 1, 2014

(30) Foreign Application Priority Data

Oct. 16, 2013 (TW) ..... 102137392 A

(51) Int. Cl.
*G09G 3/36* (2006.01)
*G09G 3/20* (2006.01)

(52) U.S. Cl.
CPC ..... *G09G 3/3611* (2013.01); *G09G 3/2088* (2013.01); *G09G 2352/00* (2013.01)

(58) Field of Classification Search
None
See application file for complete search history.

(56) References Cited

U.S. PATENT DOCUMENTS 4,816,816 A * 3/1989 Usui ..... G09G 3/3611 345/103
6,140,667 A * 10/2000 Yamazaki ..... H01L 21/2022 257/59
6,246,386 B1 * 6/2001 Perner ..... G09G 3/3648 345/90
6,710,839 B2 * 3/2004 Komeno ..... G02F 1/1345 349/149
6,724,444 B2 * 4/2004 Ashizawa ..... G02F 1/1368 349/43
6,927,831 B2 * 8/2005 Hagiwara ..... G02F 1/1339 349/149

(Continued)

FOREIGN PATENT DOCUMENTS

CN 1703732 A 11/2005
CN 103201764 A 7/2013
TW 201246169 11/2012

*Primary Examiner* — John M Hotaling
(74) *Attorney, Agent, or Firm* — Winston Hsu

(57) ABSTRACT

The present disclosure provides a non-overlap data transmission method for a liquid crystal display (LCD). The non-overlap data transmission method includes obtaining an entire fame image data; dividing the entire frame image data into a plurality of image data segments and individually sending the image data segments to a plurality of display processing units at the same time, wherein each of the image data segments is sent to one of the display processing units and image data of each image data segment does not overlap with image data of the other image data segments; and mutually sending image data of the image data segments through the display processing units.

26 Claims, 7 Drawing Sheets

(56) References Cited

U.S. PATENT DOCUMENTS 7,046,324 B2 * 5/2006 Ohta ..... G02F 1/134363 349/141
7,462,897 B2 * 12/2008 Endo ..... G09G 3/3233 250/553
7,575,965 B2 * 8/2009 Kuwabara ..... G02F 1/136286 257/59
7,847,904 B2 * 12/2010 Kimura ..... G02B 6/0051 349/141
8,344,378 B2 * 1/2013 Nakajima ..... H01L 29/04 257/291
8,816,912 B2 * 8/2014 Rajgopal ..... H01P 1/203 343/702
9,317,110 B2 * 4/2016 Lutnick ..... G06F 3/011
9,477,307 B2 * 10/2016 Chizeck ..... G06F 3/016
9,754,520 B2 * 9/2017 Kwon ..... G06F 3/013
9,830,872 B2 * 11/2017 Kim ..... G09G 3/3696
2003/0058395 A1 * 3/2003 Hagiwara ..... G02F 1/1339 349/139
2003/0063248 A1 * 4/2003 Komeno ..... G02F 1/1345 349/149
2006/0238487 A1 * 10/2006 Shih ..... 345/102
2008/0180384 A1 * 7/2008 Aoki ..... G09G 3/3607 345/102
2008/0186272 A1 * 8/2008 Huang ..... G09G 3/3426 345/102
2008/0273002 A1 * 11/2008 Kim ..... G02F 1/13452 345/98
2011/0037784 A1 * 2/2011 Shiomi ..... G09G 3/3426 345/690
2011/0037785 A1 * 2/2011 Shiomi ..... G09G 3/3406 345/690
2011/0200254 A1 * 8/2011 Taniguchi ..... G09G 3/3611 382/173
2011/0229106 A1 * 9/2011 Cho ..... 386/219
2012/0069062 A1 * 3/2012 Ishihara ..... G09G 3/3611 345/690
2012/0194564 A1 * 8/2012 White ..... G09G 3/2092 345/690
2012/0274659 A1 * 11/2012 Asanuma et al. ..... 345/629

* cited by examiner

NON-OVERLAP DATA TRANSMISSION METHOD FOR LIQUID CRYSTAL DISPLAY AND RELATED TRANSMISSION CIRCUIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present disclosure relates to a non-overlap data transmission method for liquid crystal device and related transmission circuit, and more particularly, to transmission method for non-overlap data and related transmission circuit.

2. Description of the Prior Art

In the prior art, a display chip can process image data from the left side and the right side. Due to requirements for some particular panel design, however, the output image data from a transmission port and an image processing unit might not be symmetric. Some parts of the image data from left side and the right side are overlapped. Or when the display device is performing particular image process, for example, Zigzag application, color process, edge enhancement or multi-port transmission, the image processing chip at the front end has to send the overlapped image data to the display chip.

SUMMARY OF THE INVENTION

It is therefore an objective of the present invention to provide a non-overlap data transmission method for a liquid crystal display.

The present disclosure provides a non-overlap data transmission method for a liquid crystal display (LCD). The non-overlap data transmission method includes obtaining an entire fame image data; dividing the entire frame image data into a plurality of image data segments and individually sending the image data segments to a plurality of display processing units at the same time, wherein each of the image data segments is sent to one of the display processing units and image data of each image data segment does not overlap with image data of the other image data segments; and mutually sending image data of the image data segments through the display processing units.

The present disclosure further provides a transmission circuit for a liquid crystal device (LCD). The transmission circuit includes a plurality of transmission ports and a plurality of display processing units. The plurality of transmission ports are used for obtaining an obtaining an entire fame image data and dividing the entire frame image data into a plurality of image data segments and individually sending the image data segments to a plurality of display processing units at the same time, wherein each of the image data segments is sent to one of the display processing units and image data of each image data segment does not overlap with image data of the other image data segments. The plurality of display processing units are used for receiving the image data segments and mutually sending image data of the image data segments through, wherein each of the display processing units individually receives one of the image data segments.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
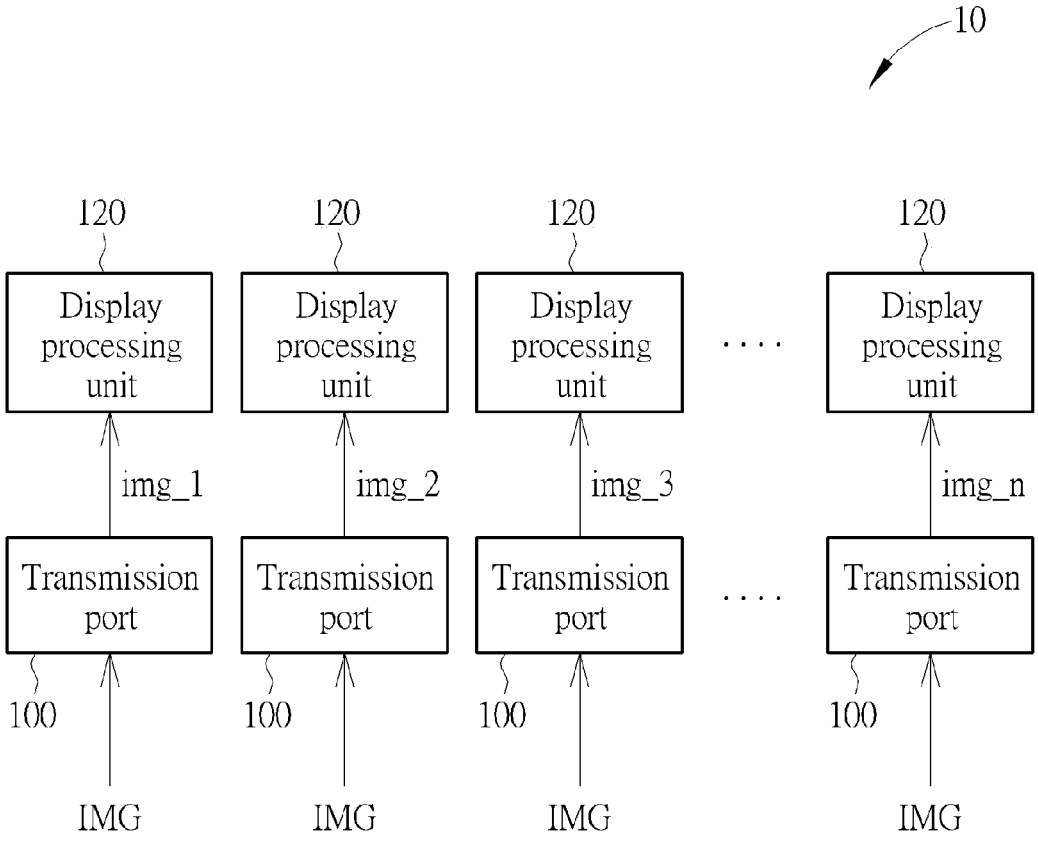
FIG. 1 is a schematic diagram of an exemplary transmission circuit.

Please refer to FIG. 1, which is a schematic diagram of an exemplary transmission circuit 10. The transmission circuit 10 can be used in a liquid crystal display (LCD) device for performing non-overlap data transmission. The transmission circuit 10 includes multiple transmission ports 100 and multiple display processing units 120. The transmission ports 100 are used for obtaining an entire frame image data IMG from a front end circuit (e.g. image processing chip) and dividing the entire frame image data into multiple image data segments img_1, img_2, . . . , img_n, and individually sending the image data segments img_1, img_2, . . . img_n to the display processing units 120. Each of the image data segments img_1, img_2, . . . , img_n is sent to one of the display processing units 120, and the image data of each image segment does not overlap with the image data of the other image segments. In other words, the image segments do not share the same image data with each other and each image segment corresponds to one of the display processing units 120. The display processing units 120, preferably, can be implemented by display chips. After receiving the image data segments, the display processing units 120 mutually send the image data of the image data segments img_1, img_2, . . . , img_n to each other, in order to support the particular image process (e.g. Zigzag application, color process, edge enhancement or multi-port transmission) when the overlapped image data is not supported.

Figure 2:
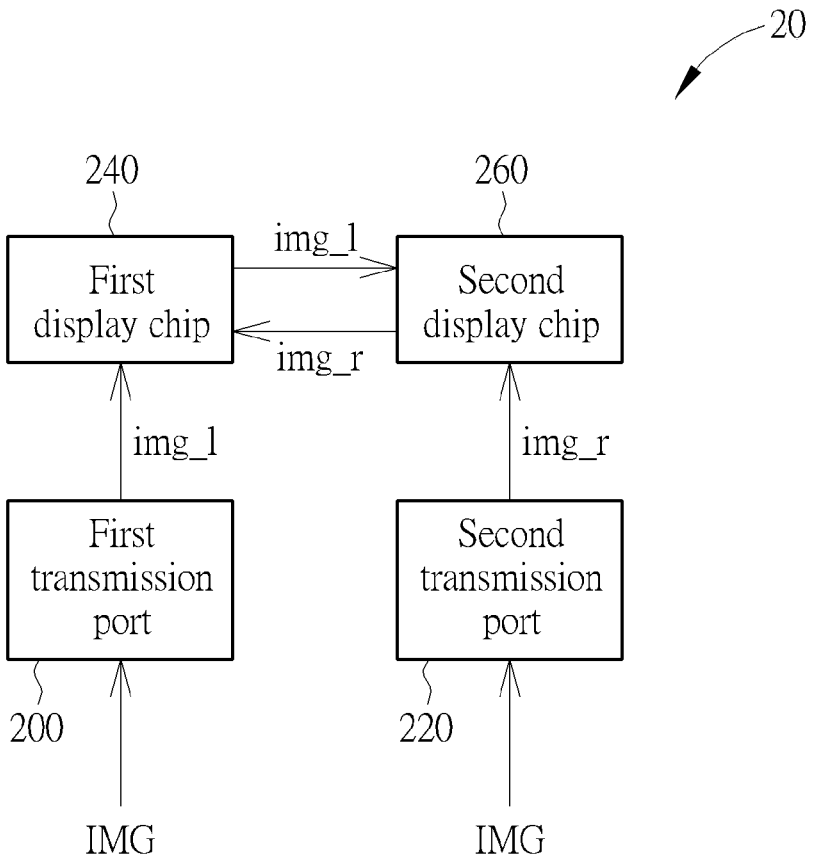
FIG. 2 is a schematic diagram of another exemplary transmission circuit.

Take two transmission ports as an example, please refer to FIG. 2. FIG. 2 is a schematic diagram of another exemplary transmission circuit 20. The transmission circuit 20 can implement the transmission circuit 10 in FIG. 1. The transmission circuit 20 includes a first transmission port 200, a second transmission port 220, a first display chip 240 and a second display chip 260. After the entire frame image data IMG is received, the first transmission port 200 and the second transmission port 220 individually send left side image data img_l and right side image data img_r of the entire frame image data IMG to the first display chip 240 and the second display chip 260. The structure of the particular LCD device may cause that the left side image data segment img_l and the right side image data segment are not symmetric (i.e. the left side image data segment img_l and the right side image data segment have different amounts of pixels). After the first display chip 240 and the second display chip 260 receive the left side image data segment img_l and the right side image data segment img_r, respectively, the transmission circuit 20 allows the first display chip 240 and the second display chip 260 to mutually send the left side image data segment img_l and the right side image data segment img_r to each other, compensating for the missing image data due to the asymmetric structure. Thus, it is not necessary to send the same boundary data between the left image and the right image, repeatedly. Besides, the transmission circuit 20 can perform particular image process (e.g. Zigzag application, color process, edge enhancement or multi-port transmission) by mutually sending the left side image data segment img_l and the right side image data segment img_r via the first display chip 240 and the second display chip 260 when the overlapped image data is supported.

Figure 3:
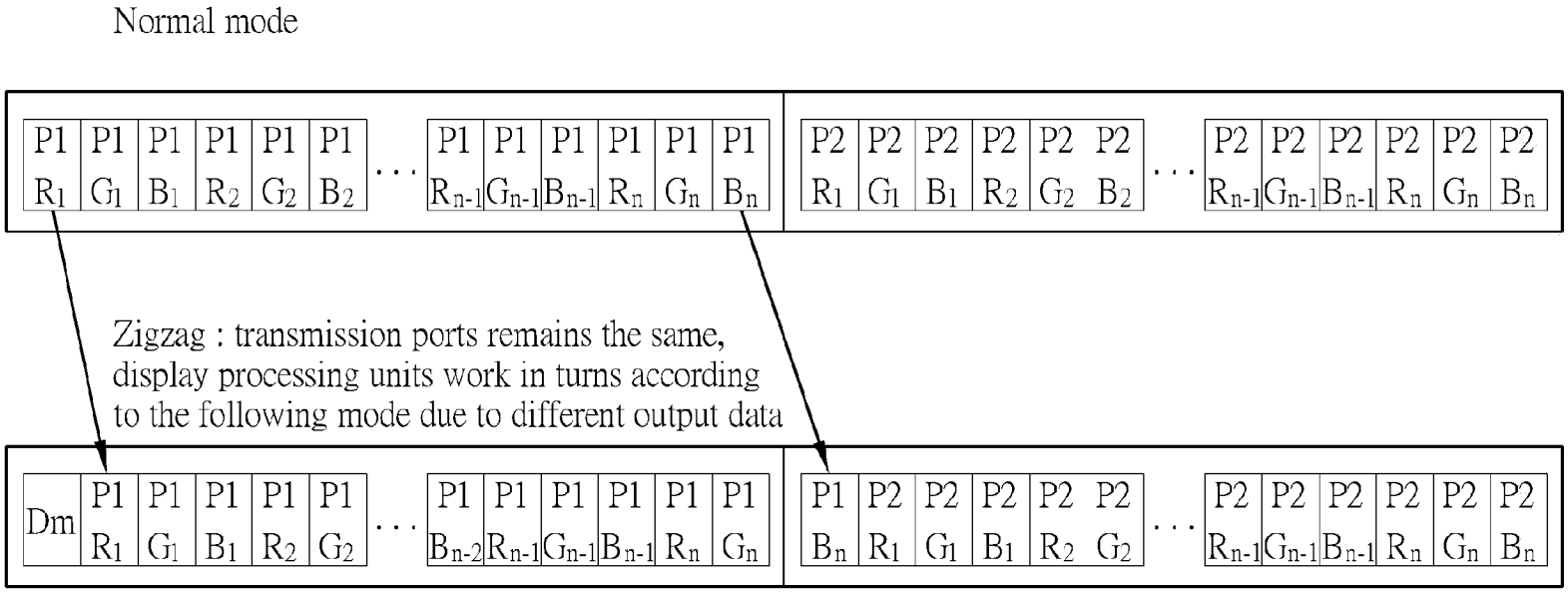
FIGS. 3 and 4 illustrate the left side image data img_l and the right side image data img_r when Zigza application is performed.
Figure 4:
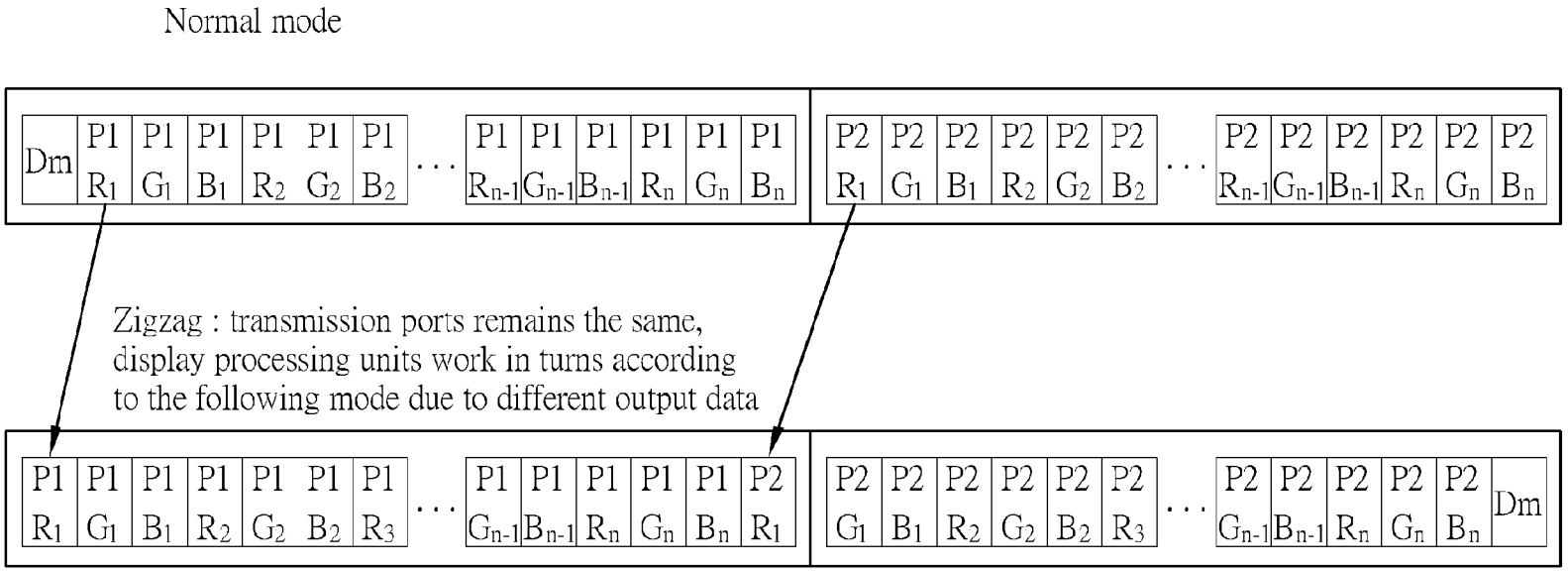

Please refer to FIGS. 3 and 4, which illustrate the left side image data segment img_l and the right side image data segment img_r when Zigza application is performed. In FIG. 3, the upper part illustrates the left side image data segment img_l and the right side image data segment img_r in a normal mode, and the lower part illustrates the left side image data segment img_l and the right side image data segment img_r when the Zigzag application is performed. The left side image data segment img_l includes pixels (P1; R1)-(P1; G1)-(P1; B1)-(P1; R2)-(P1; G2)-(P1; B2)- . . . -(P1; Rn)-(P1; Gn)-(P1; Bn) and the right side image data segment img_r includes (P2; R1)-(P2; G1)-(P2; B1)-(P2; R2)-(P2; G2)-(P2; B2)- . . . -(P2; Rn)-(P2; Gn)-(P2; Bn). As shown in FIG. 3, the first display chip 240 sends the boundary image data of the left side image data segment img_l, which is adjacent to the right side image data segment img_r, to the first display chip 260 since Zigzag application causes the image data shifting. In FIG. 4, the upper part illustrates the left side image data segment img_l and the right side image data segment img_r in the normal mode, and the lower part illustrates the left side image data segment img_l and the right side image data segment img_r when the Zigzag application is performed. The left side image data segment img_l includes pixels (P1; R1)-(P1; G1)-(P1; B1)-(P1; R2)-(P1; G2) (P1; B2)- . . . -(P1; Rn)-(P1; Gn)-(P1; Bn) and the right side image data segment includes (P2; R1)-(P2; G1)-(P2; B1)-(P2; R2)-(P2; G2)-(P2; B2)- . . . -(P2; Rn)-(P2; Gn)-(P2; Bn). As seen in FIG. 4, the second display chip 260 sends the boundary image data of the right side image data segment img_r, which is adjacent to the left side image data img_l, to the first display chip 260.

Figure 5:
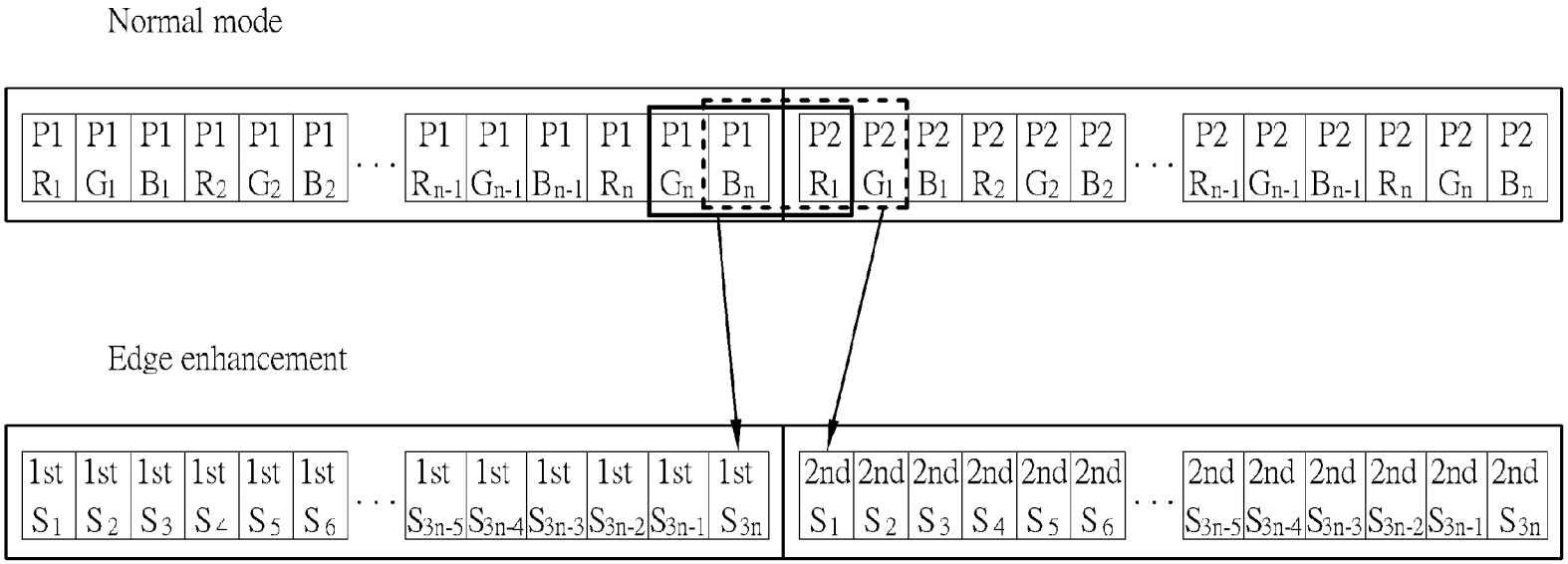
FIGS. 5 and 6 illustrate the left side image data img_l and the right side image data img_r when edge enhancement is performed.
Figure 6:
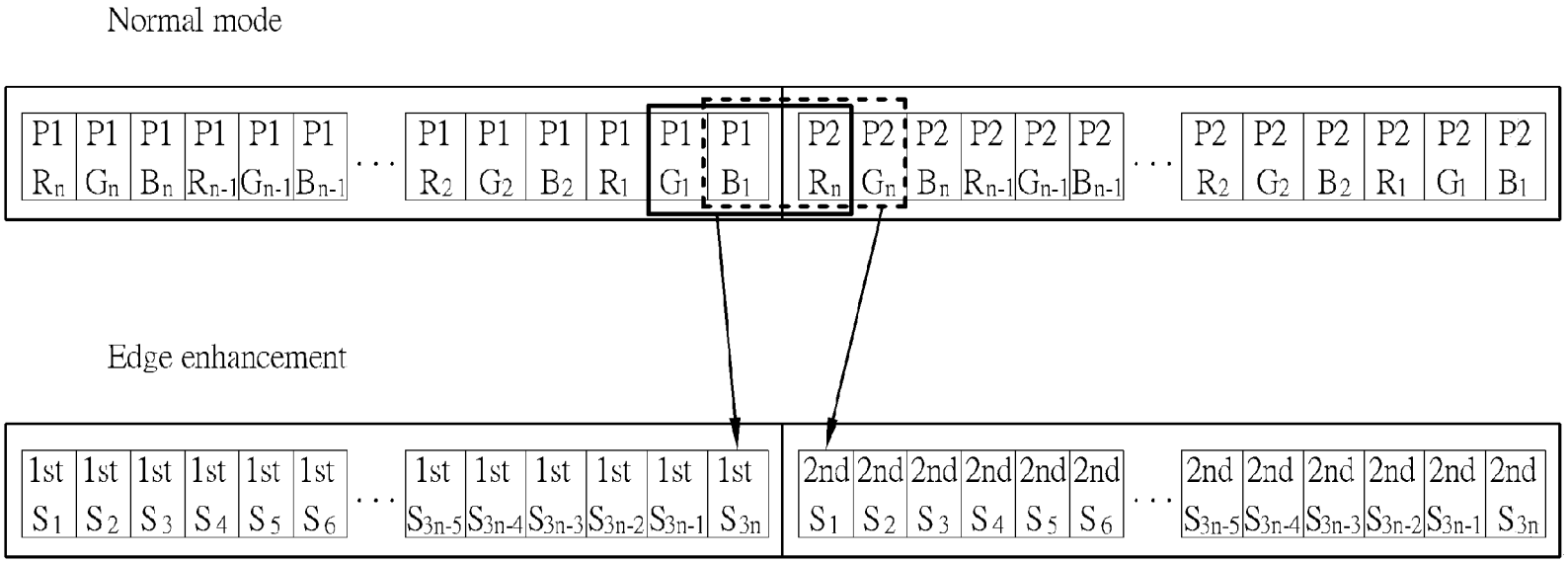

Please refer to FIGS. 5 and 6, which illustrate the left side image data segment img_l and the right side image data segment img_r when the edge enhancement is performed. In FIG. 5, the upper part illustrates the left side image data segment img_l and the right side image data segment img_r in the normal mode and the lower part illustrates the left side image data segment img_l and the right side image data segment img_r when the edge enhancement is performed. The left side image data segment img_l in the upper part includes pixels (P1; R1)-(P1; G1)-(P1; B1)-(P1; R2)-(P1; G2)-(P1; B2)- . . . -(P1; Rn)-(P1; Gn)-(P1; Bn) and the right side image data segment img_r in the upper part includes pixels (P2; R1)-(P2; G1)-(P2; B1)- (P2; R2)-(P2; G2)-(P2; B2)- . . . -(P2; Rn)-(P2; Gn)-(P2; Bn). The left side image data segment img_l in the lower part includes edge-enhanced data (1st; S1)-(1st; S2)-(1st; S3)- . . . -(1st; S3n) and the right side image data segment img_r in the lower part includes edge-enhanced data (2nd; S1)-(2nd; S2)-(2nd; S3)- . . . -(2nd; S3n). As shown in FIG. 5, the second display chip 260 sends the first pixel (P2; R1) of the ride side image data segment img_r to the first display chip 240 to complete the calculation for the last pixel (1st; S3n) of the left side image data segment img_l when the frame is transmitting from the left to the right due to the edge enhancement. The first display chip 240 sends the last pixel (P1; Bn) of the left side image data segment img_l to the second display image 260 to complete the calculation for the first pixel (2nd; S1) of the right side image data segment img_r. In FIG. 6, the upper part illustrates the left side image data segment img_l and the right side image data segment img_r in the normal mode and the lower part illustrates the left side image data segment img_l and the right side image data segment img_r when the edge enhancement is performed. The left side image data segment img_l in the upper part includes the pixels (P1; B1)-(P1; G1)-(P1; R1)-(P1; B2)-(P1; G2)-(P1; R2)- . . . -(P1; Bn)-(P1; Gn)-(P1; Rn) and the right side image data segment img_r in the upper part includes (P2; B1)-(P2; G1)-(P2; R1)-(P2; B2)-(P2; G2)-(P2; R2)- . . . -(P2; Bn)-(P2; Gn)-(P2; Rn). The left side image data segment img_l in the lower part includes the edge-enhanced image data (1st; S1)-(1st; S2)-(1st; S3)- . . . -(1st; S3n) and the right side image data segment img_r in the lower part includes the edge-enhanced image data (2nd; S1)-(2nd; S2)-(2nd; S3)- . . . -(2nd; S3n). As seen in FIG. 6, the first display 240 sends the first pixel (P1; B1) of the left side image data segment img_l to the second display chip 260 to complete the calculation for the last pixel (2nd; S1) of the right side image data segment img_r. The second display chip 260 sends the last pixel (P2; Rn) of the right side image data segment img_r to the first display chip 240, in order to complete the calculation of the first pixel (1st; S3n) of the left side image data segment img_l.

Figure 7:
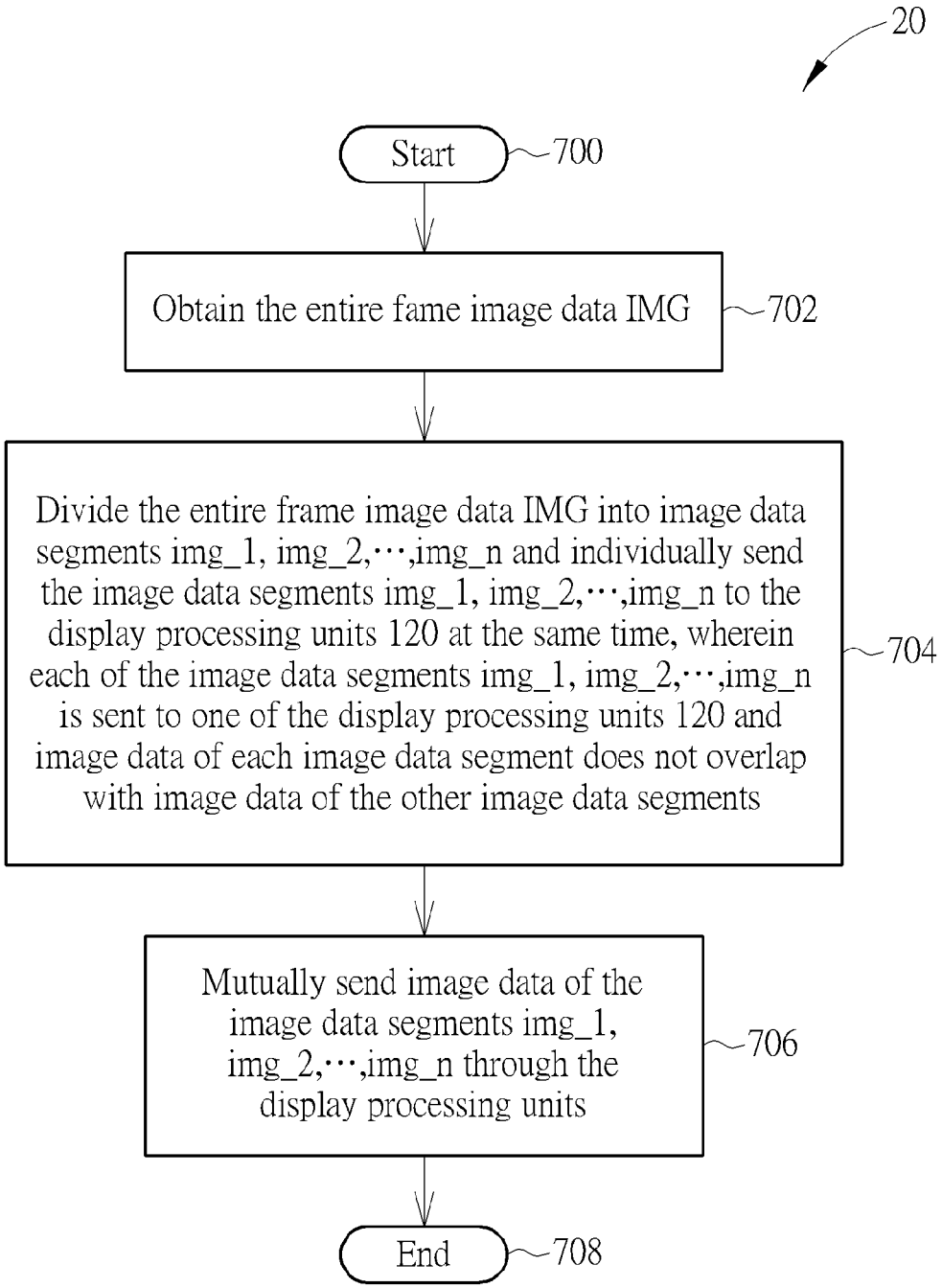
FIG. 7 is a flow chart of an exemplary process.

The operations of the transmission circuit 10 can be synthesized into a process 70, as shown in FIG. 7. The process 70 can be used in a liquid crystal device (LCD) for performing non-overlap data transmission. The process 70 includes the following steps:

Step 700: Start.

Step 702: Obtain the entire fame image data IMG.

Step 704: Divide the entire frame image data IMG into image data segments img_1, img_2, . . . , img_n and individually send the image data segments img_1, img_2, . . . , img_n to the display processing units 120 at the same time, wherein each of the image data segments img_, img_2, . . . img_n is sent to one of the display processing units 120 and image data of each image data segment does not overlap with image data of the other image data segments.

Step 706: Mutually send image data of the image data segments img_1, img_2, . . . , img_n through the display processing units.

Step 708: End.

The detailed description of the process 70 can be found above, and thus omitted herein.

To sum up, the examples of the present disclosure divide the entire frame image data IMG into the multiple image data segments and send the image data segments to the display processing units at the same time. By using the display processing units to mutually send the image data segments to each other, the examples of the present disclosure can execute particular image process, such as Zigzag application, color process, edge enhancement and multi-port transmission, when the overlapped image data is not support.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-overlap data transmission method for a liquid crystal display (LCD) comprising:

obtaining an entire frame image data;

dividing the entire frame image data into a plurality of image data segments and individually sending the image data segments to a plurality of display processing units at the same time, wherein each of the image data segments is sent to one of the display processing units and image data of each image data segment does not overlap with image data of the other image data segments; and mutually sending image data of the image data segments through the display processing units;

wherein the step of mutually sending the image data of the image data segments through the display processing units comprises:

a first display processing unit of the display processing units sending image data of a first image data segment *of the image data segments* to a second display processing unit of the display processing units; and the second display processing unit of the display processing units sending image data of a second image data segment *of the image data segments* to the first display processing unit of the display processing [unit] *units*.

2. The method of claim 1, wherein the image data of the first image data segment is a first boundary image data adjacent to the second image data segment and the image data of the second image data segment is a second boundary image data adjacent to the first image data segment.

3. The method of claim 1, wherein the image data of the first image data segment is the last pixel of the first image data segment and the image data of the second image data segment is the first pixel of the second image data segment when the entire frame image data is transmitting from the left to the right.

4. The method of claim 1, wherein the image data of the first image data segment is the first pixel of the first image data segment and the image data of the second image data segment is the last pixel of the second image data segment when the entire frame image data is transmitting from the right to the left.

5. A transmission circuit for a liquid crystal device (LCD) comprising:

a plurality of transmission ports for obtaining an entire frame image data and dividing the entire frame image data into a plurality of image data segments and individually sending the image data segments to a plurality of display processing units at the same time, wherein each of the image data segments is *configured to be* sent to one of the display processing units and image data of each image data segment does not overlap with image data of the other image data segments; and a plurality of display processing units for receiving the image data segments and mutually sending image data of the image data segments, wherein each of the display processing units *is configured to* individually [receives] *receive* one of the image data segments;

wherein a first display processing unit of the display processing units [sends] *is configured to send* image data of a first image data segment *of the image data segments* to a second display processing unit of the display processing units and the second display processing unit of the display processing units [sends] *is configured to send* image data of a second image data segment *of the image data segments* to the first display processing unit of the display processing [unit] *units*.

6. The transmission circuit of claim 5, wherein the image data of the first image data segment is a first boundary image data adjacent to the second image data segment and the image data of the second image data segment is a second boundary image data adjacent to the first image data segment.

7. The transmission circuit of claim 5, wherein the image data of the first image data segment is the last pixel of the first image data segment and the image data of the second image data segment is the first pixel of the second image data segment when the entire frame image data is transmitting from the left to the right.

8. The transmission circuit of claim 5, wherein the image data of the first image data segment is the first pixel of the first image data segment and the image data of the second image data segment is the last pixel of the second image data segment when the entire frame image data is transmitting from the right to the left.

*9. A data transmission method for a display, comprising:*

*obtaining a frame image data;*

*dividing the frame image data into a plurality of image data segments and individually sending the image data segments to a plurality of display processing units, wherein each of the image data segments is sent to one of the display processing units;*

*sending a first signal from a first display processing unit of the display processing units to a second display processing unit of the display processing units, wherein the first signal is obtained according to at least a part of image data of a first image data segment of the image data segments by the first display processing unit; and*

*sending a second signal from the second display processing unit of the display processing units to the first display processing unit of the display processing units, wherein the second signal is obtained according to at least a part of image data of a second image data segment of the image data segments by the second display processing unit.*

*10. The method of claim 9, wherein an image data of each image data segment does not overlap with the image data of the other image data segments.*

*11. The method of claim 9, wherein the part of the image data of the first image data segment comprises a first boundary image data adjacent to the second image data segment.*

*12. The method of claim 9, wherein the part of the image data of the second image data segment comprises a second boundary image data adjacent to the first image data segment.*

*13. The method of claim 9, wherein the part of the image data of the first image data segment comprises a last pixel data of the first image data segment.*

*14. The method of claim 9, wherein the part of the image data of the second image data segment comprises a first pixel data of the second image data segment.*

*15. The method of claim 9, wherein the part of the image data of the first image data segment comprises a first pixel of the first image data segment.*

*16. The method of claim 9, wherein the part of the image data of the second image data segment comprises a last pixel data of the second image data segment.*

*17. A transmission circuit for a display, comprising:*

*a plurality of transmission ports for obtaining a frame image data and dividing the entire frame image data into a plurality of image data segments and individu-*

*ally sending the image data segments to a plurality of display processing units, wherein each of the image data segments is sent to one of the display processing units; and*

*a plurality of display processing units for receiving the image data segments, wherein each of the display processing units individually receives one of the image data segments;*

*wherein a first display processing unit of the display processing units is configured to obtain a first signal according to at least a part of image data of a first image data segment of the image data segments and send the first signal to a second display processing unit of the display processing units;*

*wherein the second display processing unit of the display processing units is configured to obtain a second signal according to at least a part of image data of a second image data segment of the image data segments and send the second signal to the first display processing unit of the display processing unit.*

*18. The transmission circuit of claim 17, wherein an image data of each image data segment does not overlap with the image data of the other image data segments.*

*19. The transmission circuit of claim 17, wherein the part of the image data of the first image data segment comprises a first boundary image data adjacent to the second image data segment.*

*20. The transmission circuit of claim 17, wherein the part of the image data of the second image data segment comprises a second boundary image data adjacent to the first image data segment.*

*21. The transmission circuit of claim 17, wherein the part of the image data of the first image data segment comprises a last pixel data of the first image data segment.*

*22. The transmission circuit of claim 17, wherein the part of the image data of the second image data segment comprises a first pixel data of the second image data segment.*

*23. The transmission circuit of claim 17, wherein the part of the image data of the first image data segment comprises a first pixel of the first image data segment.*

*24. The transmission circuit of claim 17, wherein the part of the image data of the second image data segment comprises a last pixel data of the second image data segment.*

*25. A data transmission method for a display, comprising:*

*obtaining a frame image data;*

*obtaining a plurality of image data segments according to the frame image data;*

*individually sending the image data segments to a plurality of display processing units, wherein each of the image data segments is sent to one of the display processing units and;*

*communicating by a first display processing unit of the display processing units with a second display processing unit of the display processing units based on at least a part of image data of a first image data segment of the image data segments; and*

*communicating by the second display processing unit of the display processing units with the first display processing unit of the display processing units based on at least a part of image data of a second image data segment of the image data segments.*

*26. A transmission circuit for a display comprising:*

*a plurality of transmission ports for individually sending a plurality of image data segments to a plurality of display processing units, wherein each of the image data segments is configured to be sent to one of the display processing units; and*

*a plurality of display processing units for receiving the image data segments, wherein each of the display processing units is configured to individually receive one of the image data segments;*

*wherein a first display processing unit of the display processing units is configured to communicate with a second display processing unit of the display processing units based on at least a part of image data of a first image data segment of the image data segments; and*

*wherein the second display processing unit of the display processing units is configured to communicate with the first display processing unit of the display processing units based on at least a part of image data of a second image data segment of the image data segments.*

* * * * *